(12) United States Patent
Nakamatsu et al.

(10) Patent No.: US 12,415,928 B2
(45) Date of Patent: Sep. 16, 2025

(54) ANTI-FOG SHEET STRUCTURE AND HELMET

(71) Applicant: Sharp Display Technology Corporation, Kameyama (JP)

(72) Inventors: Kenichiro Nakamatsu, Kameyama (JP); Mitsuaki Sugine, Kameyama (JP); Hideya Hashii, Kameyama (JP); Tokio Taguchi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/911,418

(22) Filed: Oct. 10, 2024

(65) Prior Publication Data

US 2025/0145837 A1 May 8, 2025

(30) Foreign Application Priority Data

Nov. 7, 2023 (JP) .................. 2023-190014

(51) Int. Cl.
*A42B 3/24* (2006.01)
*A42B 3/04* (2006.01)
*C09D 4/00* (2006.01)
*C09D 5/16* (2006.01)
*C09D 133/14* (2006.01)
*C09D 135/02* (2006.01)
*G02B 1/115* (2015.01)

(52) U.S. Cl.
CPC .......... *C09D 5/1668* (2013.01); *A42B 3/0406* (2013.01); *C09D 4/00* (2013.01); *C09D 133/14* (2013.01); *C09D 135/02* (2013.01)

(58) Field of Classification Search
CPC ...... C09D 5/1668; C09D 4/00; C09D 133/14; C09D 135/02; A42B 3/0406; A42B 3/24
See application file for complete search history.

(56) References Cited

U.S. PATENT DOCUMENTS

| | | | |
|---|---|---|---|
| 10,625,489 B2* | 4/2020 | Hayashi | .................. B32B 27/08 |
| 11,335,831 B2* | 5/2022 | Hayashi | ............. H10H 20/8506 |
| 2004/0067339 A1* | 4/2004 | Gandon | ................ B44C 5/0407 428/156 |
| 2007/0159698 A1 | 7/2007 | Taguchi et al. | |

(Continued)

FOREIGN PATENT DOCUMENTS

| | | |
|---|---|---|
| JP | 2009-166502 A | 7/2009 |
| JP | 3202173 U | 1/2016 |

(Continued)

*Primary Examiner* — Robert H Muromoto, Jr.
(74) *Attorney, Agent, or Firm* — ScienBiziP, P.C.

(57) ABSTRACT

An anti-fog sheet structure includes: a substrate made of polycarbonate, a first synthetic polymer film formed on a first main surface side of the substrate, and a second synthetic polymer film formed on a second main surface side, wherein the first synthetic polymer film has, on its surface, a plurality of first bumps having an equivalent circular area diameter Dp1 in the range of more than 50 nm and less than 500 nm, the second synthetic polymer film has, on its surface, a plurality of second bumps having an equivalent circular area diameter Dp2 in the range of more than 20 nm and less than 500 nm, and the first synthetic polymer film is formed from a cured product of a photocurable resin containing 30 mass % or more of ethoxylated pentaerythritol tetraacrylate.

13 Claims, 5 Drawing Sheets

(56) References Cited

U.S. PATENT DOCUMENTS

| | | | |
|---|---|---|---|
| 2012/0318772 A1* | 12/2012 | Minoura | ............ C25D 11/04 |
| | | | 216/52 |
| 2013/0274405 A1 | 10/2013 | Tanabiki et al. | |
| 2015/0140154 A1 | 5/2015 | Isurugi et al. | |
| 2017/0068116 A1 | 3/2017 | Wang | |
| 2019/0016084 A1* | 1/2019 | Hayashi | ............ B32B 27/308 |

FOREIGN PATENT DOCUMENTS

| | | |
|---|---|---|
| JP | 2016-109979 A | 6/2016 |
| WO | 2011/125486 A1 | 10/2011 |
| WO | 2012/086552 A1 | 6/2012 |
| WO | 2013/183576 A1 | 12/2013 |

\* cited by examiner 500 nm 500 nm

ANTI-FOG SHEET STRUCTURE AND HELMET

BACKGROUND

1. Field

The present disclosure relates to anti-fog sheet structures and helmets.

2. Description of the Related Art

For example, anti-fog face shields have been developed for helmets.

Japanese Registered Utility Model No. 3202173 discloses an anti-fog film structure used for helmets. The anti-fog film structure disclosed in Japanese Registered Utility Model No. 3202173 includes an anti-fog film produced by improving the hydrophilicity of the surface of a triacetate cellulose film by way of saponification.

International Publication No. 2012/086552 discloses an anti-fog coating resin composition including a water-absorbent resin composition, and a plastic laminate produced by using the resin composition. The anti-fog coating resin composition contains a specific (meth)acrylamide copolymer, which is a copolymer of a (meth)acrylamide monomer and another monomer, and at least one bifunctional or higher (meth)acrylate compound. The anti-fog coating resin composition is applied to a polycarbonate plate and cured by exposure to UV light to form a coated surface, and the coated surface has anti-fog properties, as described in International Publication No. 2012/086552.

Japanese Unexamined Patent Application Publication No. 2016-109979 discloses an anti-reflection plate with anti-glare properties used for information display panels placed for advertising purposes in locations where many people can see the panels. The anti-reflection plate disclosed in Japanese Unexamined Patent Application Publication No. 2016-109979 has, on each side, an anti-reflection film having a moth-eye structure on its surface. When the anti-reflection film is made of hydrophilic resin, the surface having the moth-eye structure exhibits super-hydrophilic properties and has a contact angle to water of 20° or less, as described in Japanese Unexamined Patent Application Publication No. 2016-109979. Water droplets, when attached to the super-hydrophilic surface, spread thinly and evaporate quickly. The super-hydrophilic surface thus has an anti-fog action, as described in Japanese Unexamined Patent Application Publication No. 2016-109979.

The anti-fog properties required for the face shield of a helmet may be such that, for example, the anti-fog time (the time for the transmittance to decrease to 80% of its initial value with the face shield in contact with saturated water vapor at 50° C.) in the anti-fog test in accordance with the ECE R22-5 standard is at least 20 seconds or longer, and may be 90 seconds or longer.

The structures described in Japanese Registered Utility Model No. 3202173, International Publication No. 2012/086552, and Japanese Unexamined Patent Application Publication No. 2016-109979, however, fail to achieve the anti-fog properties required for the face shield of a helmet. For example, International Publication No. 2012/086552 only evaluates exhaled breath anti-fog properties (whether fogging occurs after exhaled breath is blown to the coated surface for 5 seconds) and hot-water anti-fog properties (whether fogging occurs 60 seconds after the coated surface is placed on a beaker containing 40° C. hot water such that the coated surface faces the hot water surface). Using only the hydrophilic surface as in Japanese Registered Utility Model No. 3202173 or Japanese Unexamined Patent Application Publication No. 2016-109979 has limitations in anti-fog properties under conditions where evaporation is difficult to occur.

It is desirable to provide, for example, an anti-fog sheet structure that can satisfy an anti-fog time of 90 seconds or longer in the anti-fog test in accordance with the ECE R22-5 standard, and a helmet including the anti-fog sheet structure.

SUMMARY

According to an aspect of the disclosure, there is provided an anti-fog sheet structure including:
  a substrate made of a transparent plastic,
  a first synthetic polymer film formed on a first main surface side of the substrate, and
  a second synthetic polymer film formed on a second main surface side of the substrate on an opposite side from a first main surface,
  wherein the first synthetic polymer film has, on its surface, a plurality of first bumps having an equivalent circular area diameter Dp1 in a range of more than 50 nm and less than 500 nm as viewed in a normal direction of the first synthetic polymer film,
  the second synthetic polymer film has, on its surface, a plurality of second bumps having an equivalent circular area diameter Dp2 in a range of more than 20 nm and less than 500 nm as viewed in a normal direction of the second synthetic polymer film,
  the first synthetic polymer film is formed from a cured product of a photocurable resin containing 30 mass % or more of ethoxylated pentaerythritol tetraacrylate,
  the second synthetic polymer film is formed from a cured product of a photocurable resin, and
  the anti-fog sheet structure has anti-fog properties such that a time for a visible light in-line transmittance of the first synthetic polymer film to decrease to 80% of an initial value with the surface of the first synthetic polymer film in contact with saturated water vapor at 50° C. is 90 seconds or longer.

DESCRIPTION OF THE EMBODIMENTS

An anti-fog sheet structure and a full-face helmet including an anti-fog sheet structure according to embodiments of the present disclosure will be described below with reference to the drawings. The anti-fog sheet structure and the helmet according to the embodiments of the present disclosure are not limited to those illustrated below, and the anti-fog sheet structure according to the embodiment of the present disclosure may also be attached to helmets other than full-face helmets.

Figure 1:
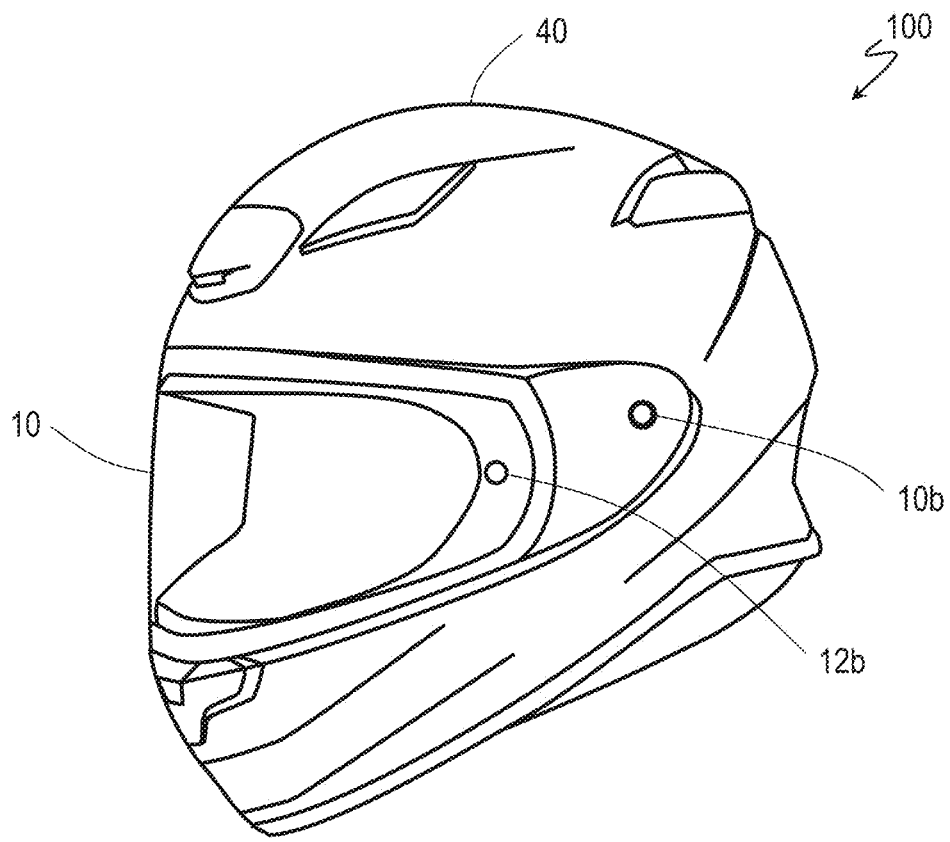
FIG. 1 is a schematic side view of a full-face helmet including an anti-fog sheet structure according to an embodiment of the present disclosure.
Figure 2:
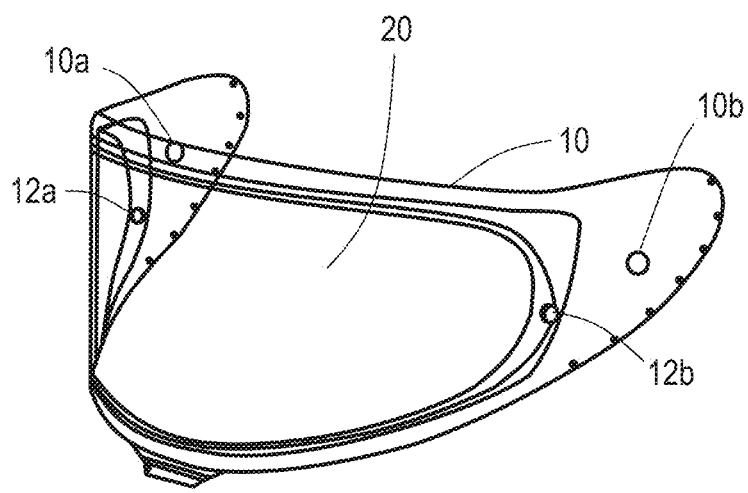
FIG. 2 is a schematic perspective view of a shield of the full-face helmet.
Figure 3:
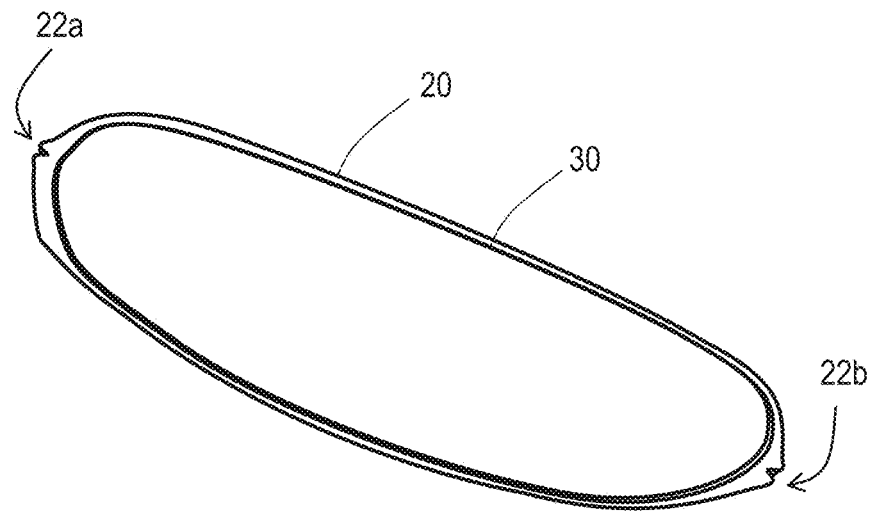
FIG. 3 is a schematic perspective view of an anti-fog sheet structure to be attached to the shield.
Figure 4:
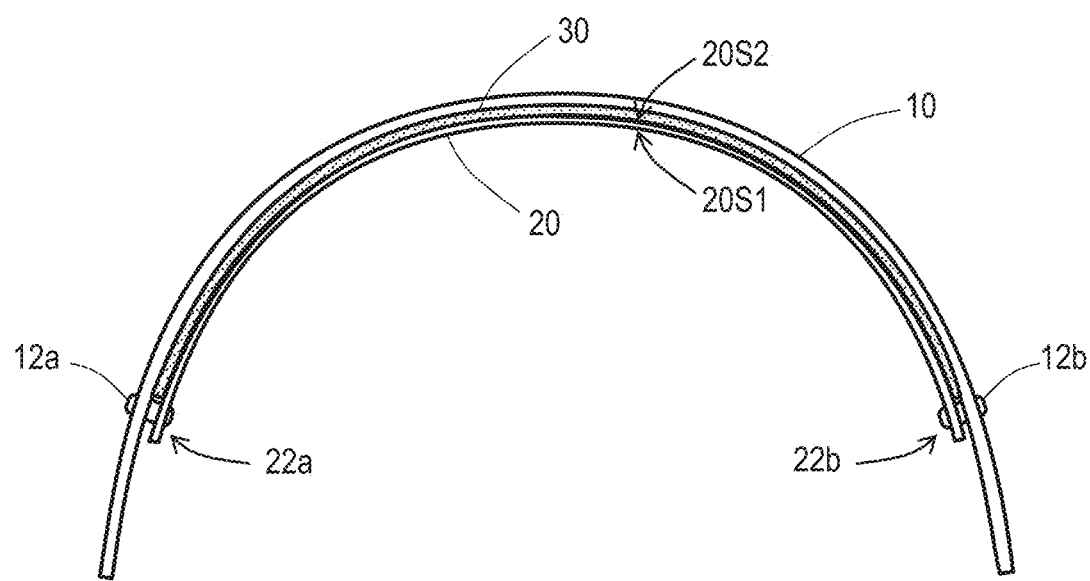
FIG. 4 is a top view of the anti-fog sheet structure attached to the shield.
Figure 5:
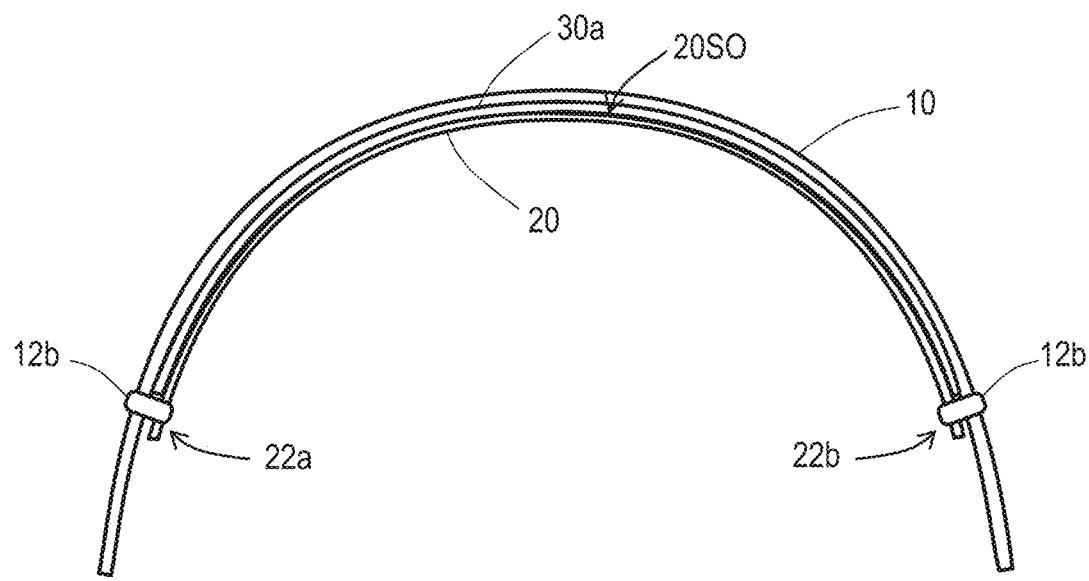
FIG. 5 is a schematic horizontal sectional view of the anti-fog sheet structure attached to the shield.

First, the structure of a full-face helmet 100 including an anti-fog sheet structure 20 will be described with reference to FIGS. 1 to 5. FIG. 1 is a schematic side view of the full-face helmet 100 including an anti-fog sheet structure according to an embodiment of the present disclosure, and FIG. 2 is a schematic perspective view of a shield 10 of the full-face helmet 100. FIG. 3 is a schematic perspective view of the anti-fog sheet structure 20 to be attached to the shield 10. FIG. 4 is a top view of the anti-fog sheet structure 20 attached to the shield 10, and FIG. 5 is a schematic horizontal sectional view of the anti-fog sheet structure 20 attached to the shield 10.

Referring to FIG. 1, the helmet 100 includes the shield 10 and a shell 40. The helmet 100 further includes the anti-fog sheet structure 20 inside the shield 10 with a gap 30a (see FIG. 5) therebetween. Referring to FIGS. 1 and 2, the shield 10 is attached to the shell 40 by inserting pins on the shell 40 into holes 10a and 10b. The anti-fog sheet structure 20 is removably adhered to the inner surface of the shield 10 with a seal 30 by fitting pins 12a and 12b of the shield 10 into notches 22a and 22b (see FIGS. 3 and 4). The seal 30 is made of, for example, silicone sealant and has a width of about 1 mm or more and about 5 mm or less and a height of about 1 mm or more and about 5 mm or less. The seal 30 allows a sealed gap (space) 30a to be formed between the inner surface of the shield 10 and an outer surface 20SO of the anti-fog sheet structure 20. The gap 30a has an effect of thermally insulating the anti-fog sheet structure 20 from the shield 10. In other words, even if the shield 10 is exposed to cold outside air, the temperature of the anti-fog sheet structure 20 is less likely to drop rapidly. The shield 10 is made of, for example, polycarbonate or acrylic resin with a thickness of about 0.5 mm or more and about 10 mm or less.

The helmet 100 further includes a shock absorbing liner, an interior structure, a chinstrap, and other elements, which are not shown and omitted here for simplicity. The elements of the helmet 100 other than the anti-fog sheet structure 20 may be the same as those of known full-face helmets.

Figure 6:
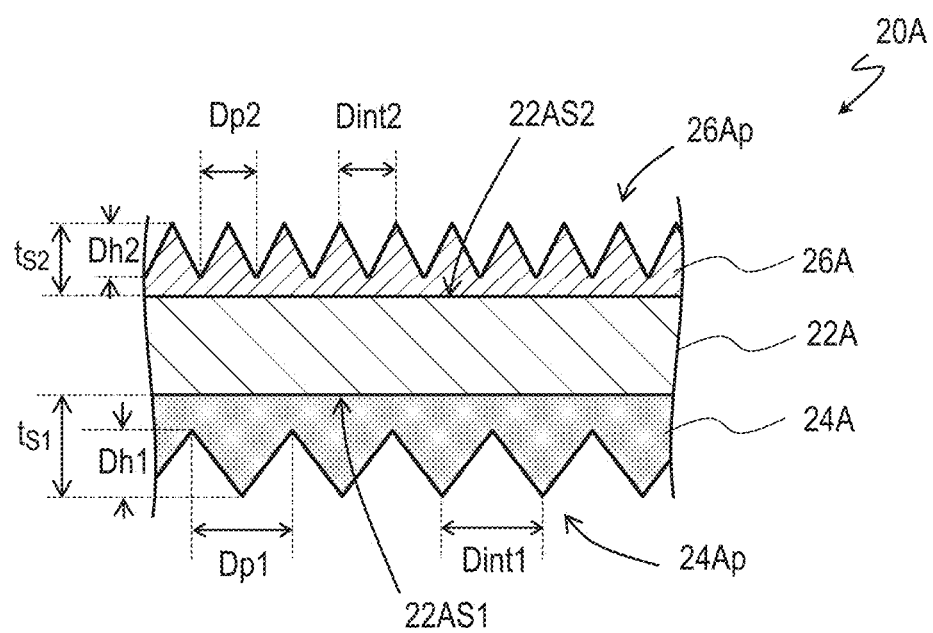
FIG. 6 is a schematic sectional view of an anti-fog sheet structure according to an embodiment of the present disclosure.
Figure 7:
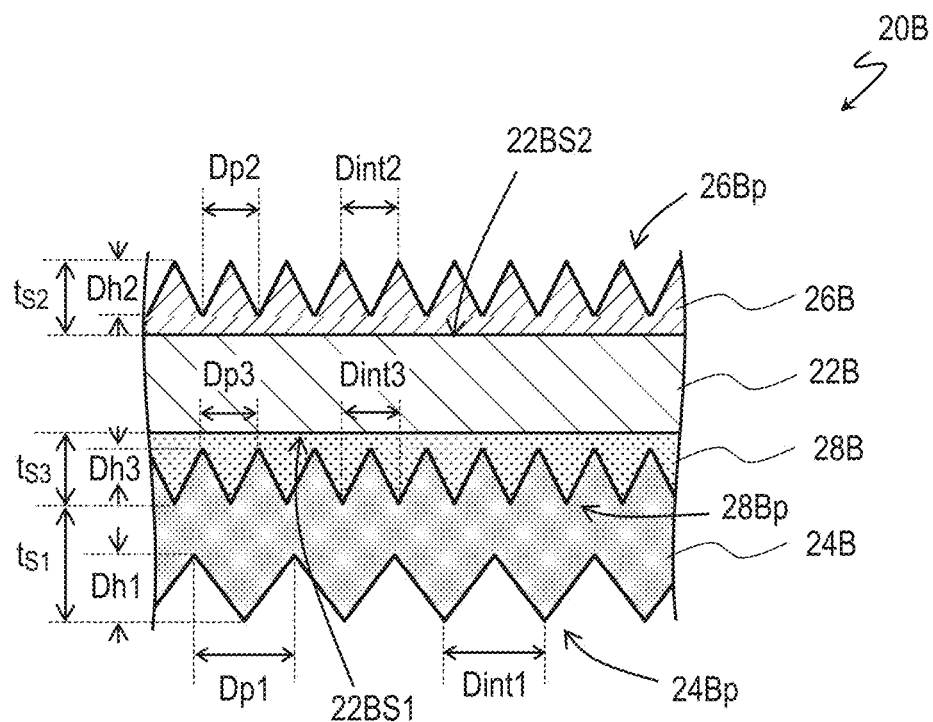
FIG. 7 is a schematic sectional view of an anti-fog sheet structure according to an embodiment of the present disclosure.

Referring now to FIGS. 6 and 7, examples of the anti-fog sheet structure according to the embodiments of the present disclosure will be described.

FIG. 6 illustrates the schematic sectional view of an anti-fog sheet structure 20A according to the embodiment of the present disclosure. The anti-fog sheet structure 20A has a substrate 22A made of polycarbonate, a first synthetic polymer film 24A formed on a first main surface 22AS1 side of the substrate 22A, and a second synthetic polymer film 26A formed on a second main surface 22AS2 side of the substrate 22A on the opposite side from the first main surface 22AS1. The anti-fog sheet structure 20A is configured such that the first synthetic polymer film 24A comes inside when the helmet is worn. In other words, the seal 30 is attached to the second synthetic polymer film 26A formed opposite the first synthetic polymer film 24A across the substrate 22A, and the anti-fog sheet structure 20A is removably adhered to the inner surface of the shield 10 with the seal 30 such that the second synthetic polymer film 26A faces the inner surface of the shield 10. The same applies to an anti-fog sheet structure 20B described below. The substrate 22A has, for example, a thickness of about 0.3 mm or more and about 1.0 mm or less. The material of the substrate 22A may be, but not necessarily, polycarbonate used as an example from the viewpoint of the close contact between the substrate 22A and the first synthetic polymer film 24A and/or the close contact between the substrate 22A and the second synthetic polymer film 26A, or may be a transparent (visible light transmittance of 90% or more) plastic, such as acrylic resin or PET. The surface of the substrate 22A may be treated with a primer as appropriate.

The first synthetic polymer film 24A has multiple first bumps 24Ap on its surface, and the second synthetic polymer film 26A has multiple second bumps 26Ap on its surface. The multiple first bumps 24Ap and the multiple second bumps 26Ap form a moth-eye structure.

The moth-eye structure is based on the principle of a so-called moth-eye (moth's eye). The moth-eye structure has fine bumps controlled to be smaller than or equal to the wavelength of visible light ($\lambda$=380 nm to 780 nm) and continuously changes the refractive index for incident light from the refractive index of the incident medium to the refractive index of the substrate in the depth direction of the bumps to reduce reflection. The moth-eye structure is characterized by its ability to exhibit an anti-reflection action with small incident angle dependence over a wide wavelength range.

The applicant has developed a method for producing an anti-reflection film (anti-reflection surface) with a moth-eye structure by using an anodized porous alumina layer. The use of the anodized porous alumina layer enables production of molds with an inverted moth-eye structure with high mass productivity (Japanese Unexamined Patent Application Publication No. 2009-166502, International Publication No. WO 2011/125486, and International Publication No. WO 2013/183576). All of the disclosures of Japanese Unexamined Patent Application Publication No. 2009-166502, International Publication No. WO 2011/125486, and International Publication No. WO 2013/183576 are incorporated herein by reference in their entirety.

The moth-eye structure is formed by exposing, to UV light, a UV-curable resin between a substrate and a mold (moth eye-forming mold) with an inverted moth-eye structure formed by the above anodized porous alumina layer to cure the UV-curable resin so that the surface of the resulting UV-cured resin has a moth-eye structure transferred from the inverted moth-eye structure. In other words, a synthetic polymer film formed by a UV-cured resin with a moth-eye structure on its surface is obtained.

As viewed in the normal direction of the first synthetic polymer film 24A, the equivalent circular area diameter Dp1 of the multiple first bumps 24Ap is in the range of more than 50 nm and less than 500 nm. For example, when the first bumps 24Ap are conical, the equivalent circular area diameter Dp1 of the first bumps 24Ap corresponds to the diameter of the bases of the cones. The typical inter-distance Dint1 between adjacent first bumps 24Ap is more than 50 nm and 1000 nm or less. When the first bumps 24Ap are densely arranged and no space is present between adjacent first bumps 24Ap (e.g., the bases of the cones partially overlap each other) as illustrated in FIG. 6, the equivalent circular area diameter Dp1 of the bumps 24Ap is equal to the inter-distance D1int between adjacent first bumps 24Ap. The typical height Dh1 of the first bumps 24Ap is 50 nm or more and less than 500 nm. The thickness $t_{S1}$ of the first synthetic polymer film 24A is not limited as long as the thickness $t_{S1}$ is larger than the height Dh1 of the first bumps 24Ap.

As viewed in the normal direction of the second synthetic polymer film 26A, the equivalent circular area diameter Dp2 of the multiple second bumps 26Ap is in the range of more than 20 nm and less than 500 nm. For example, when the second bumps 26Ap are conical, the equivalent circular area diameter Dp2 of the second bumps 26Ap corresponds to the diameter of the bases of the cones. The typical inter-distance Dint2 between adjacent second bumps 26Ap is more than 20 nm and 1000 nm or less. When the second bumps 26Ap are densely arranged and no space is present between adjacent second bumps 26Ap (e.g., the bases of the cones partially overlap each other) as illustrated in FIG. 6, the equivalent circular area diameter Dp2 of the bumps 26Ap is equal to the inter-distance D2int between adjacent second bumps 26Ap. The typical height Dh2 of the second bumps 26Ap is 50 nm or more and less than 500 nm. The thickness $t_{S2}$ of the second synthetic polymer film 26A is not limited as long as the thickness $t_{S2}$ is larger than the height Dh2 of the second bumps 26Ap.

The first bumps 24Ap and the second bumps 26Ap are, for example, conical as illustrated in the figure. The first bumps 24Ap and the second bumps 26Ap may be bumps each having a portion with a uniform cross-sectional area (the cross sectional parallel to the film surface) as well as bumps each having a shape in which the cross-sectional area (the cross-section parallel to the film surface) increases toward the substrate 22A. The two-dimensional arrangement of the multiple first bumps 24Ap or the multiple second bumps 26Ap, which form the moth-eye structure, on the surface may be less regular (periodic), or random.

A moth eye-forming mold for forming a synthetic polymer film having multiple bumps that satisfy the relationship of Dint>Dp can also be produced by adjusting the time for etching the anodized porous alumina layer in the above method for producing a moth eye-forming mold. A moth-eye structure in which multiple bumps (Dp1) each having a columnar shape with a conical tip are arranged at intervals of Dint (>Dp) is formed.

The anti-fog sheet structure 20A includes the second synthetic polymer film 26A in addition to the first synthetic polymer film 24A and has a moth-eye structure on each side. This configuration prevents or reduces reflection on each side of the anti-fog sheet structure 20A, so that the anti-fog sheet structure 20A has ultra-low reflection performance. Since the moth-eye structure has low incidence angle dependence, the moth-eye structure has a high anti-reflection effect even when it is attached to the inner surface of the shield 10 to form a curved surface.

FIG. 7 illustrates the schematic sectional view of the anti-fog sheet structure 20B according to an embodiment of the present disclosure. The anti-fog sheet structure 20B has a substrate 22B made of polycarbonate, a first synthetic polymer film 24B formed on a first main surface 22BS1 side of the substrate 22B, a second synthetic polymer film 26B formed on a second main surface 22BS2 side of the substrate 22B on the opposite side from the first main surface 22BS1, and a third synthetic polymer film 28B formed between the first main surface 22BS1 of the substrate 22B and the first synthetic polymer film 24B.

The first synthetic polymer film 24B has multiple first bumps 24Bp on its surface, the second synthetic polymer film 26B has multiple second bumps 26Bp on its surface, and the third synthetic polymer film 28B has multiple third bumps 28Bp on its surface. The multiple first bumps 24Bp, the multiple second bumps 26Bp, and the multiple third bumps 28Bp form a moth-eye structure. The anti-fog sheet structure 20B differs from the anti-fog sheet structure 20A illustrated in FIG. 6 in having the third synthetic polymer film 28B. The other configuration of the anti-fog sheet structure 20B may be the same as that of the anti-fog sheet structure 20A. The equivalent circular area diameter Dp3 and height Dh3 of the multiple third bumps 28Bp of the third synthetic polymer film 28B may be the same as the equivalent circular area diameter Dp2 and height Dh2 of the multiple second bumps 26Bp of the second synthetic polymer film 26B. The third synthetic polymer film 28B acts so as to improve the close contact between the first synthetic polymer film 24B and the substrate 22B. A fourth synthetic polymer film may be provided between the second main surface 22BS2 of the substrate 22B and the second synthetic polymer film 26B to improve the close contact between the second synthetic polymer film 26B and the substrate 22B. The fourth synthetic polymer film may be formed in the same manner as the third synthetic polymer film 28B.

When the height of the multiple first bumps 24Ap and 24Bp is represented by Dh1, Dh1 may be 50 nm or more, and the aspect ratio A1=Dh1/Dp1 may be less than 1.0. When the height of the multiple second bumps 26Ap and 26Bp is represented by Dh2, the aspect ratio A2=Dh2/Dp2 may be 1.0 or more. The aspect ratio A2=Dh2/Dp2 may be 1.5 or less. The height Dh1 of the multiple first bumps 24Ap and 24Bp may satisfy 150 nm≤Dh1≤300 nm, and the height Dh2 of the multiple second bumps 26Ap and 26Bp may satisfy 150 nm≤Dh2≤200 nm. The height Dh1 of the multiple first bumps 24Ap and 24Bp may be greater than or equal to the height Dh2 of the multiple second bumps 26Ap and 26Bp.

Since the first synthetic polymer films 24A and 24B are water absorbent and have relatively low mechanical strength, the aspect ratio A1=Dh1/Dp1 may be less than 1.0. The moth-eye structure has a larger haze value than a flat surface due to light scattering. This tendency is stronger in the first bumps 24Ap and 24Bp, and thus the haze value of the entire anti-fog sheet structure may be reduced by lowering the height of the second bumps 26Ap and 26Bp.

The first synthetic polymer films 24A and 24B are formed from a cured product of a photocurable resin containing 30 mass % or more of ethoxylated pentaerythritol tetraacrylate, and the anti-fog sheet structures 20A and 20B have anti-fog properties such that the time for the visible light in-line transmittance of the first synthetic polymer films 24A and 24B to decrease to 80% of the initial value with the surface of the first synthetic polymer films 24A and 24B in contact with saturated water vapor at 50° C. is 90 seconds or longer. The second synthetic polymer films 26A and 26B may be formed from a hydrophilic cured product of a photocurable resin free of ethoxylated pentaerythritol tetraacrylate. The second synthetic polymer films 26A and 26B have, for example, hydrophilic surfaces with a (static) contact angle to water of less than 90°, as shown in Experimental Example below. The contact angle may be measured by a standard method using a contact angle meter.

As described below by way of Experimental Example, the first synthetic polymer films 24A and 24B may be formed by using, for example, the following materials. The proportions (U-105 to U-119) of the materials used in Experimental Example are shown in Tables 1 and 2 below.

Ethoxylated pentaerythritol tetraacrylate (product name: ATM-35E, available from Shin-Nakamura Chemical Co., Ltd.)

Hydrophilic urethane acrylate (product name: UA-7100, available from Shin-Nakamura Chemical Co., Ltd.)

Hydrophilic urethane acrylate (product name: UA-W2A, available from Shin-Nakamura Chemical Co., Ltd.)

2-(Vinyloxyethoxy)ethyl acrylate (product name: VEEA, available from Nippon Shokubai Co. Ltd.)

n-Vinyl-2-pyrrolidone (NVP, available from Nippon Shokubai Co. Ltd.)

Dimethylacrylamide (product name: DMAA, available from KJ Chemicals Corporation)

Phenylbis(2,4,6-trimethylbenzoyl) phosphine oxide (initiator product name: Omnirad-819, available from IGM Resins B.V.)

Hydrophobic silicone additive (product name: JAR-36, available from Jujo Chemical Co., Ltd.,)

Ethoxylated pentaerythritol tetraacrylate (ATM-35E) contains 35 ethylene oxide (EO) groups in its molecule, is highly hydrophilic, and when added in an amount of 30 mass % or more to the photocurable resin composition (excluding the initiator and the additive), may impart water absorbency to the cured photocurable resin. The surface of the photocured resin not only has hydrophilic properties but also has hygroscopic properties as a bulk.

Hydrophilic urethane acrylates (UA-7100 and UA-W2A) have high water resistance and high viscosity and thus easily form thick films. UA-7100 is less hydrophilic than UA-W2A. The water absorption rate of a cured product of a mixture of 70 mass % of UA-7100 and 30 mass % of 2-(2-vinyloxyethoxy)ethyl acrylate monomer is 2.0% or less, whereas the water absorption rate of a cured product of a mixture of 70 mass % of UA-W2A and 30 mass % of 2-(2-vinyloxyethoxy)ethyl acrylate monomer is more than 2.0%.

2-(Vinyloxyethoxy)ethyl acrylate (VEEA) has a small molecular weight and has the effect of improving close contact between the first synthetic polymer film and the polycarbonate substrate through its anchor effect.

n-Vinyl-2-pyrrolidone (NVP) also has the effect of improving close contact between the first synthetic polymer film and the polycarbonate substrate and is more hydrophilic than 2-(vinyloxyethoxy)ethyl acrylate (VEEA).

Like n-vinyl-2-pyrrolidone (NVP), dimethylacrylamide (DMAA) is highly hydrophilic and improves close contact between the first synthetic polymer film and the polycarbonate substrate.

Phenylbis(2,4,6-trimethylbenzoyl) phosphine oxide (Omnirad-819) is a general-purpose UV-sensitive initiator.

The hydrophobic silicone additive (JAR-36), when added in a small amount, allows water drops attached to the surface of the first synthetic polymer film 24A to stay as water drops on the surface without water spreading, which keeps visibility. The contact angle of the surface of the first synthetic polymer film 24A to water may be 20° or more.

The second synthetic polymer films 26A and 26B may be formed by using, for example, the following materials. The proportions (G05) of the materials used in Experimental Example are shown in Table 1 below. The second synthetic polymer films 26A and 26B are provided to further improve the anti-reflection performance of the anti-fog sheet structures 20A and 20B and formed by using, for example, the photocurable resins disclosed in Japanese Unexamined Patent Application Publication No. 2009-166502, International Publication No. WO 2011/125486, and International Publication No. WO 2013/183576, as described above. The surfaces of the second synthetic polymer films 26A and 26B are not necessarily water absorbent and may be hydrophilic or hydrophobic.

Polyethylene glycol diacrylate (product name: Miramer M280, available from Miwon Specialty Chemical Co.)

Trimethylolpropane triacrylate (product name: Miramer M300, available from Miwon Specialty Chemical Co.)

2-(Vinyloxyethoxy)ethyl acrylate (Product name: VEEA, available from Nippon Shokubai Co. Ltd.)

Phenylbis(2,4,6-trimethylbenzoyl) phosphine oxide (initiator product name: Omnirad-819, available from IGM Resins B.V.)

Diglycerol monolaurate (hydrophilic antiviral agent, product name: POEM DL-100, available from Riken Vitamin Co., Ltd.)

Diglycerol monolaurate may be omitted.

The third synthetic polymer film 28B may be formed by using, for example, the following materials. The proportions (BT7100, BTW2A) of the materials used in Experimental Example are shown in Table 3 below.

Hydrophilic urethane acrylate (product name: UA-7100, available from Shin-Nakamura Chemical Co., Ltd.)

Hydrophilic urethane acrylate (product name: UA-W2A, available from Shin-Nakamura Chemical Co., Ltd.)

2-(Vinyloxyethoxy)ethyl acrylate (product name: VEEA, available from Nippon Shokubai Co. Ltd.)

Phenylbis(2,4,6-trimethylbenzoyl) phosphine oxide (initiator product name: Omnirad-819, available from IGM Resins B.V.)

The photocurable resin composition (excluding the initiator) of the third synthetic polymer film 28B contains 30 mass % of 2-(vinyloxyethoxy)ethyl acrylate (VEEA), and thus the third synthetic polymer film 28B comes in very close contact with the polycarbonate substrate 22B. The photocurable resin composition contains hydrophilic urethane acrylates (UA-7100 and UA-W2A), and thus the third synthetic polymer film 28B also comes in very close contact with the first synthetic polymer film 24B.

Next, the anti-fog sheet structures according to the embodiments of the present disclosure will be described by way of Experimental Example. The formulations of the photocurable resin compositions used in the experiment are shown in Table 1 to Table 3 below.

TABLE 1

| Material | Material Name | Viscosity (cp) | G05 | U-105 | U-106 | U-107 | U-108 | U-109 | U-110 |
| --- | --- | --- | --- | --- | --- | --- | --- | --- | --- |
| Ethoxylated pentaerythritol tetraacrylate | ATM-35E | 350.0 | — | 60.0 | 60.0 | 65.0 | 50.0 | 50.0 | 50.0 |
| Urethane acrylate | UA-7100 | 21000.0 | — | 30.0 | 25.0 | 20.0 | 30.0 | 30.0 | 20.0 |
|  | UA-W2A | 33400.0 | — | — | — | — | — | — | 10.0 |
| Polyethylene glycol diacrylate | M280 | 65.0 | 55.0 | — | — | — | — | — | — |
| Trimethylolpropane triacrylate | M300 | 120.0 | 10.0 | — | — | — | — | — | — |

TABLE 1-continued

| Material | Material Name | Viscosity (cp) | Resin Composition | | | | | | |
|---|---|---|---|---|---|---|---|---|---|
| | | | G05 | U-105 | U-106 | U-107 | U-108 | U-109 | U-110 |
| 2-(Vinyloxyethoxy)ethyl acrylate | VEEA | 3.7 | 35.0 | 10.0 | 15.0 | 15.0 | 8.0 | — | 8.0 |
| n-Vinyl-2-pyrrolidone | NVP | 2.1 | — | — | — | — | 12.0 | 20.0 | 12.0 |
| Dimethylacrylamide | DMAA | 1.2 | — | — | — | — | — | — | — |
| Initiator | Omnirad-819 | — | 1.0 | 1.0 | 1.0 | 1.0 | 1.0 | 1.0 | 1.0 |
| Diglycerol monolaurate | POEM DL-100 | — | 1.0 | — | — | — | — | — | — |
| Silicone additive | JAR-36 | — | — | 0.1 | 0.1 | 0.1 | 0.1 | 0.1 | 0.1 |

TABLE 2

| Material | Material Name | Viscosity (cp) | Resin Composition | | | | | | |
|---|---|---|---|---|---|---|---|---|---|
| | | | U-111 | U-112 | U-113 | U-115 | U-117 | U-118 | U-119 |
| Ethoxylated pentaerythritol tetraacrylate | ATM-35E | 350.0 | 52.0 | 52.0 | 62.0 | 47.0 | 30.0 | 30.0 | 37.3 |
| Urethane acrylate | UA-7100 | 21000.0 | 30.0 | 30.0 | — | — | — | — | — |
| | UA-W2A | 33400.0 | — | — | 25.0 | 35.0 | 45.0 | 40.0 | 38.2 |
| Polyethylene glycol diacrylate | M280 | 65.0 | — | — | — | — | — | — | — |
| Trimethylolpropane triacrylate | M300 | 120.0 | — | — | — | — | — | — | — |
| 2-(Vinyloxyethoxy)ethyl acrylate | VEEA | 3.7 | — | 5.0 | 13.0 | 18.0 | 25.0 | 30.0 | 6.9 |
| n-Vinyl-2-pyrrolidone | NVP | 2.1 | — | — | — | — | — | — | 17.6 |
| Dimethylacrylamide | DMAA | 1.2 | 18.0 | 13.0 | — | — | — | — | — |
| Initiator | Omnirad-819 | — | 1.0 | 1.0 | 1.0 | 1.0 | 1.0 | 1.0 | 1.0 |
| Diglycerol monolaurate | POEM DL-100 | — | — | — | — | — | — | — | — |
| Silicone additive | JAR-36 | — | 0.1 | 0.1 | 0.1 | 0.1 | 0.1 | 0.1 | 0.05 |

TABLE 3

| Material | Material Name | Viscosity (cp) | Resin Composition | |
|---|---|---|---|---|
| | | | BT7100 | BTW2A |
| Urethane acrylate | UA-7100 | 21000.0 | 70.0 | — |
| | UA-W2A | 33400.0 | — | 70.0 |
| 2-(Vinyloxyethoxy)ethyl acrylate | VEEA | 3.7 | 30.0 | 30.0 |
| Initiator | Omnirad-819 | — | 1.0 | 1.0 |

In Experimental Example, a polycarbonate film (NF-2000 clear, available from Mitsubishi Gas Chemical Company, Inc.), 0.7 mm thick and 7 cm×7 cm, was used as a substrate.

The equivalent circular area diameter Dp1 of the multiple first bumps and the inter-distance Dint1 between adjacent first bumps in the first synthetic polymer film were 150 nm and 180 nm, respectively.

The equivalent circular area diameter Dp2 of the multiple second bumps and the inter-distance Dint2 between adjacent second bumps in the second synthetic polymer film were 150 nm and 150 nm, respectively. The equivalent circular area diameter Dp3 of the multiple third bumps and the inter-distance Dint3 between adjacent third bumps in the third synthetic polymer film were the same as the equivalent circular area diameter Dp2 of the second bumps and the inter-distance Dint2 between adjacent second bumps. In other words, the second synthetic polymer film and the third synthetic polymer film were formed by using the same moth eye-forming mold.

Figure 8:
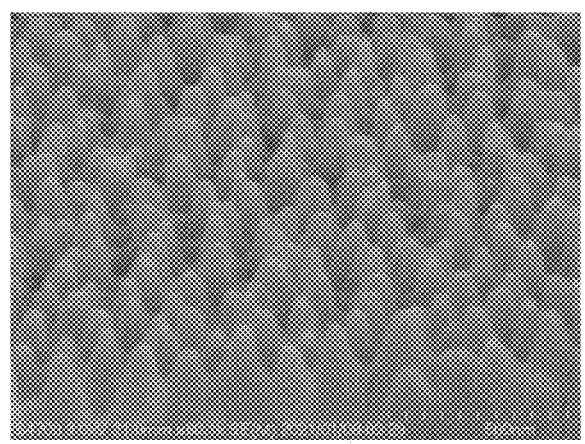
FIG. 8 is an SEM image of one moth-eye structure of a first synthetic polymer film.
Figure 9:
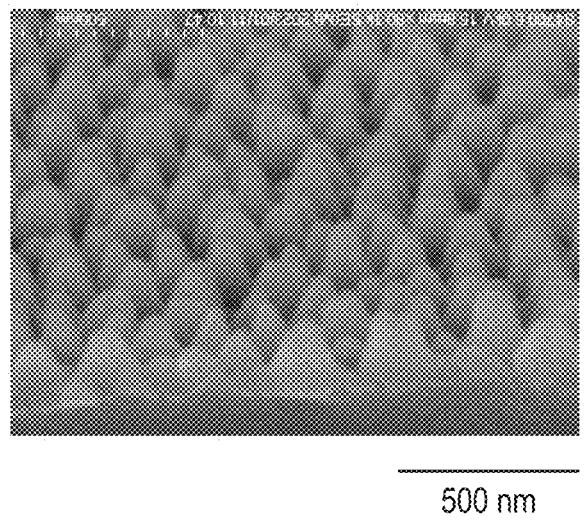
FIG. 9 is an SEM image of another moth-eye structure of the first synthetic polymer film.

FIG. 8 and FIG. 9 illustrate examples of the SEM images of the moth-eye structures of the first synthetic polymer film. The moth-eye structure in FIG. 8 had Dp1 of 150 nm, Dint1 of 150 nm, and Dh1 of 130 nm. The moth-eye structure in FIG. 9 had Dp1 of 150 nm, Dint1 of 180 nm, and Dh1 of 120 nm. The SEM images were obtained by using electron microscope S-4700 available from Hitachi High-Tech Corporation. The SEM images show that desired moth-eye structures are formed.

The haze value, the total light transmittance, the reflectance (Y-value), a* and b* of transmitted light in the L*a*b* color space, and the contact angle to water were measured for Sample A of an anti-fog sheet structure having U-108 (thickness: 130 μm)/PC substrate (thickness: 0.7 mm)/G05 (thickness: 15 μm). The haze value and the total light transmittance were measured by using turbidimeter NDH2000 available from Nippon Denshoku Industries Co., Ltd. The reflectance and the chromaticity (a* and b*) were measured by using spectrophotometer V-560 available from JASCO Corporation. The contact angle to water was measured by using portable contact angle meter V-560 available from Kyowa Interface Science Co., Ltd. The results are shown in Table 4 below.

TABLE 4

| Haze Value (%) | Total Light Transmittance (%) | Reflectance Y-Value (%) | Transmitted Light Chromaticity | | Contact Angle to Water (°) |
|---|---|---|---|---|---|
| | | | a* | b* | |
| 0.48 | 99.0 | 0.67 | −0.32 | 0.69 | 30.6 |

Sample A of the anti-fog sheet structure has a low haze value of 1.0(%) or less, a high total light transmittance for visible light of 90.0% or more, and a low reflectance of 1.0% or less. The absolute value of a* and the absolute value of b* in the L*a*b* color space are each independently 1.0 or less, indicating that there is no coloration. The contact angle of the first synthetic polymer film to water is 20° or more, and water drops attached to the surface of the first synthetic polymer film stay as water drops on the surface without water spreading.

The anti-fog sheet structures according to the embodiments of the present disclosure have an asymmetric structure in the thickness direction as illustrated in FIGS. 6 and 7 and, for example, when immersed in water, the anti-fog sheet structures curl such that the first synthetic polymer film side becomes convex. For example, Sample A of the anti-fog sheet structure was immersed in tap water in a stainless steel bat, left to stand for 5 hours, then pulled up to the air, and observed for its appearance. Sample A curled to a height of about 5 cm such that first synthetic polymer film side became convex.

An example of evaluation of anti-fog properties using Sample B will be described below. Hot water of 50° C. (+0.5° C.) was poured into a hot bath, and Sample B was placed above the hot bath such that the first synthetic polymer film (water-absorbing layer) was in contact with saturated water vapor. The time (anti-fog time) until fogging was visually observed was measured. The visible light transmittance at the time when fogging was visually observed was higher than 80%, which can be said to be a slightly stricter condition than in the anti-fog test in accordance with the ECE R22-5 standard. The dependence of the thickness of the first synthetic polymer film (water-absorbing layer) on the anti-fog time was also evaluated. The results are shown in Table 5 below.

TABLE 5

| Film Thickness (μm) | | | Anti-Fog |
| --- | --- | --- | --- |
| First Synthetic Polymer Film | Third Synthetic Polymer Film | Total | Time (s) |
| 22.4 | 23.0 | 45.4 | 135 |
| 24.1 | 21.9 | 46.0 | 96 |
| 24.7 | 22.8 | 47.5 | 114 |
| 25.0 | 23.0 | 48.0 | 129 |
| 33.0 | 22.0 | 55.0 | 145 |
| 45.1 | 17.1 | 62.2 | 225 |
| 85.0 | 58.0 | 143.0 | 500 |

It is revealed that the anti-fog time is 90 seconds or longer when the first synthetic polymer film has a thickness of about 20 μm. It is also revealed that the anti-fog time increases almost in proportion to the thickness of the first synthetic polymer film. From the viewpoint of mass production, the first synthetic polymer film may have a thickness not more than about 150 μm, and the anti-fog time may be 90 seconds or longer when the first synthetic polymer film has a thickness of about 20 μm or more and about 100 μm or less.

The results of evaluation of the hydrophilicity and water absorbency of the first synthetic polymer film using the resin compositions (U-105 to U-119) in Tables 1 and 2 are shown in Tables 6 to 8 below. The hydrophilicity was evaluated by "observing the behavior in the evaluation of exhaled-breath and hot-water anti-fog properties (50° C. water bath surface)", where A indicates that the film does not fog with exhaled breath and maintains the water film state above the 50° C. water bath surface, and B indicates that the film does not fog with exhaled breath and, above the 50° C. water bath surface, does not change or become a water film for a certain time but starts to fog later. The water absorbency is evaluated by "evaluation of hot-water anti-fog properties (50° C. hot bath surface) (measurement of anti-fog time)," where B indicates that the anti-fog time is 90 seconds or longer, C indicates the anti-fog time is 20 seconds or longer and shorter than 90 seconds, and D indicates that the anti-fog time is shorter than 20 seconds.

After the hydrophilicity and water absorbency tests, the film may peel off or deform due to swelling (water resistance). U-113, U-115, U-117, and U-118 have some issues with water resistance. If the resin is soft, adjacent bumps in the moth-eye structure may come into close contact with each other, which is called sticking. U-111 was susceptible to sticking, depending on the height of the bumps. U-105 and U-119 were particularly superior in terms of water resistance and sticking resistance, in addition to hydrophilicity and water absorbency. The close contact between the first synthetic polymer film and the substrate may be improved by, for example, providing an adhesive layer (third synthetic polymer film) and by selecting the material of the adhesive layer, as appropriate.

Of the anti-fog sheet structure samples used in the evaluation, U-105 has the anti-fog sheet structure 20B illustrated in FIG. 7, and the other samples have the anti-fog sheet structure 20A illustrated in FIG. 6. The third synthetic polymer film was made of BT7100 (50 μm thick). The second synthetic polymer film was made of G05 (10 μm thick), and the first synthetic polymer film 50 was 70 μm thick.

TABLE 6

| | G05 | U-105 | U-106 | U-107 | U-108 | U-109 | U-110 |
| --- | --- | --- | --- | --- | --- | --- | --- |
| Hydrophilicity | A | B | B | B | B | B | B |
| Water Absorbency | D | B | C | C | B | B | B |

TABLE 7

| | U-111 | U-112 | U-113 | U-115 | U-117 | U-118 | U-119 |
| --- | --- | --- | --- | --- | --- | --- | --- |
| Hydrophilicity | B | B | B | B | B | B | B |
| Water Absorbency | B | B | B | B | B | B | B |

TABLE 8

| | BT7100 | BTW2A |
| --- | --- | --- |
| Hydrophilicity | B | B |
| Water Absorbency | C | B |

The water absorption rate of the first synthetic polymer films (U-105, U-108, U-110, U-112) and the third synthetic polymer films (BT7100, BTW2A) were determined as follows.

The first synthetic polymer film or the third synthetic polymer film was formed on a polycarbonate film (0.7 mm thick, 7 cm×7 cm, 4.246 g), which was a substrate. The initial mass A of each of the obtained samples was measured, and the mass B of each sample when it started to fog in the anti-fog test was measured. The mass of water absorbed by the first synthetic polymer film or the third synthetic polymer film was obtained from B-A. The ratio (expressed as percentage) of the mass of absorbed water to the initial mass of the first third synthetic polymer film or the third synthetic polymer film was calculated as a water absorption rate. The obtained results are shown in Table 9.

TABLE 9

| No. | Sample | Total Mass (g) A. initial | Total Mass (g) B. after anti-fog test | Water Absorption B − A (g) | Mass of Cured Film (g) | Water Absorption Rate (%) | Average Water Absorption Rate (%) |
|---|---|---|---|---|---|---|---|
| 1 | U-105 | 4.667 | 4.712 | 0.045 | 0.421 | 10.570 | 10.583 |
| 2 | | 4.598 | 4.635 | 0.037 | 0.352 | 10.597 | |
| 3 | U-108 | 4.605 | 4.661 | 0.056 | 0.359 | 15.535 | 13.817 |
| 4 | | 4.580 | 4.623 | 0.043 | 0.334 | 12.874 | |
| 5 | | 4.568 | 4.610 | 0.042 | 0.322 | 13.043 | |
| 6 | U-110 | 4.630 | 4.710 | 0.080 | 0.384 | 20.833 | 17.665 |
| 7 | | 4.598 | 4.658 | 0.060 | 0.352 | 17.045 | |
| 8 | | 4.693 | 4.760 | 0.067 | 0.446 | 15.118 | |
| 9 | U-112 | 4.711 | 4.767 | 0.056 | 0.465 | 12.043 | 12.106 |
| 10 | | 4.585 | 4.619 | 0.034 | 0.339 | 10.029 | |
| 11 | | 4.611 | 4.663 | 0.052 | 0.365 | 14.247 | |
| 12 | BT-7100 | 5.211 | 5.222 | 0.011 | 0.965 | 1.161 | 1.532 |
| 13 | | 5.144 | 5.161 | 0.017 | 0.898 | 1.904 | |
| 14 | BT-W2A | 5.100 | 5.170 | 0.070 | 0.854 | 8.208 | 7.380 |
| 15 | | 5.399 | 5.474 | 0.075 | 1.153 | 6.551 | |

It is revealed that all of the first synthetic polymer films have a high water absorption rate of more than 10%. The third synthetic polymer films had a low water absorption rate. In particular, the water absorption rate of BT7100 was as low as 2% or less.

The abrasion resistance of anti-fog sheet structure according to embodiments of the present disclosure was evaluated. The anti-fog sheet structure illustrated in FIGS. 8 and 9 and a commercially available anti-fog sheet were used as samples. The evaluation was performed with steel wool (product name: #0000, available from Bonstar Corporation), a rubbing speed of 6000 mm/min, a rubbing distance of 10 mm, and a rubbing frequency of 10 times.

Deep scratches were formed on the commercial product in the abrasion resistance test, whereas the scratches were slight on all of the anti-fog sheet structure according to the embodiments of the present disclosure. This indicates that the anti-fog sheet structure according to the embodiments of the present disclosure have sufficient abrasion resistance.

The anti-fog sheet structure according to the embodiments of the present disclosure are suitably used for helmets and other products.

Embodiments of the present disclosure provide solutions described in the following items.

[Item 1]

The anti-fog sheet structure comprising:
  An substrate made of a transparent plastic,
  a first synthetic polymer film formed on a first main surface side of the substrate, and
  a second synthetic polymer film formed on a second main surface side of the substrate on an opposite side from a first main surface,
  wherein the first synthetic polymer film has, on its surface, a plurality of first bumps having an equivalent circular area diameter Dp1 in a range of more than 50 nm and less than 500 nm as viewed in a normal direction of the first synthetic polymer film,
  the second synthetic polymer film has, on its surface, a plurality of second bumps having an equivalent circular area diameter Dp2 in a range of more than 20 nm and less than 500 nm as viewed in a normal direction of the second synthetic polymer film,
  the first synthetic polymer film is formed from a cured product of a photocurable resin containing 30 mass % or more of ethoxylated pentaerythritol tetraacrylate,
  the second synthetic polymer film is formed from a cured product of a photocurable resin, and
  the anti-fog sheet structure has anti-fog properties such that a time for a visible light in-line transmittance of the first synthetic polymer film to decrease to 80% of an initial value with the surface of the first synthetic polymer film in contact with saturated water vapor at 50° C. is 90 seconds or longer.
  The transparent plastic forming the substrate is preferably polycarbonate.

[Item 2]

The anti-fog sheet structure according to Item 1,
  wherein, when a height of the plurality of first bumps is represented by Dh1, Dh1 is 50 nm or more, and an aspect ratio A1=Dh1/Dp1 is less than 1.0; and
  when a height of the plurality of second bumps is represented by Dh2, an aspect ratio A2=Dh2/Dp2 is 1.0 or more.

[Item 3]

The anti-fog sheet structure according to Item 2, wherein the height Dh1 of the plurality of first bumps satisfies 150 nm≤Dh1≤300 nm.

[Item 4]

The anti-fog sheet structure according to Item 2 or 3, wherein the height Dh2 of the plurality of second bumps satisfies 150 nm≤Dh2≤200 nm.

[Item 5]

The anti-fog sheet structure according to any one of Items 2 to 4, wherein the aspect ratio A2=Dh2/Dp2 is 1.5 or less.

[Item 6]
The anti-fog sheet structure according to any one of Items 2 to 5, wherein the height Dh1 of the plurality of first bumps is greater than or equal to the height Dh2 of the plurality of second bumps.

[Item 7]
The anti-fog sheet structure according to any one of Items 1 to 6, wherein the surface of the first synthetic polymer film has a contact angle to water of 20° or more.

[Item 8]
The anti-fog sheet structure according to any one of Items 1 to 7, wherein the first synthetic polymer film is formed from a cured product of the photocurable resin further containing urethane acrylate.

[Item 9]
The anti-fog sheet structure according to Item 8, wherein the urethane acrylate is such that a cured product of a mixture of 70 mass % of the urethane acrylate and 30 mass % of 2-(2-vinyloxyethoxy)ethyl acrylate monomer has a water absorption rate of more than 2.0%.

[Item 10]
The anti-fog sheet structure according to any one of Items 1 to 9, further comprising a third synthetic polymer film formed between the first main surface of the substrate and the first synthetic polymer film,
wherein the third synthetic polymer film has, on its surface, a plurality of third bumps having an equivalent circular area diameter Dp3 in a range of more than 20 nm and less than 500 nm as viewed in a normal direction of the third synthetic polymer film.

[Item 11]
The anti-fog sheet structure according to any one of Items 1 to 10, wherein the anti-fog sheet structure has a haze value of 1.0 or less.

[Item 12]
The anti-fog sheet structure according to any one of Items 1 to 11, wherein an absolute value of a* and an absolute value of b* of transmitted light in an L*a*b* color space are each independently 1.0 or less.

[Item 13]
A helmet comprising a shield and a shell,
wherein the helmet further comprises an anti-fog sheet structure inside the shield with a gap therebetween,
the anti-fog sheet structure is the anti-fog sheet structure according to any one of Items 1 to 12 and configured such that the first synthetic polymer film comes inside when the helmet is worn.

The present disclosure contains subject matter related to that disclosed in Japanese Priority Patent Application JP 2023-190014 filed in the Japan Patent Office on Nov. 7, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An anti-fog sheet structure comprising:
a substrate made of a transparent plastic,
a first synthetic polymer film formed on a first main surface side of the substrate, and
a second synthetic polymer film formed on a second main surface side of the substrate on an opposite side from a first main surface,
wherein the first synthetic polymer film has, on its surface, a plurality of first bumps having an equivalent circular area diameter Dp1 in a range of more than 50 nm and less than 500 nm as viewed in a normal direction of the first synthetic polymer film,
the second synthetic polymer film has, on its surface, a plurality of second bumps having an equivalent circular area diameter Dp2 in a range of more than 20 nm and less than 500 nm as viewed in a normal direction of the second synthetic polymer film,
the first synthetic polymer film is formed from a cured product of a photocurable resin containing 30 mass % or more of ethoxylated pentaerythritol tetraacrylate,
the second synthetic polymer film is formed from a cured product of a photocurable resin, and
the anti-fog sheet structure has anti-fog properties such that a time for a visible light in-line transmittance of the first synthetic polymer film to decrease to 80% of an initial value with the surface of the first synthetic polymer film in contact with saturated water vapor at 50° C. is 90 seconds or longer.

2. The anti-fog sheet structure according to claim 1, wherein, when a height of the plurality of first bumps is represented by Dh1, Dh1 is 50 nm or more, and an aspect ratio A1=Dh1/Dp1 is less than 1.0; and
when a height of the plurality of second bumps is represented by Dh2, an aspect ratio A2=Dh2/Dp2 is 1.0 or more.

3. The anti-fog sheet structure according to claim 2, wherein the height Dh1 of the plurality of first bumps satisfies 150 nm≤Dh1≤300 nm.

4. The anti-fog sheet structure according to claim 2, wherein the height Dh2 of the plurality of second bumps satisfies 150 nm≤Dh2≤200 nm.

5. The anti-fog sheet structure according to claim 2, wherein the aspect ratio A2=Dh2/Dp2 is 1.5 or less.

6. The anti-fog sheet structure according to claim 2, wherein the height Dh1 of the plurality of first bumps is greater than or equal to the height Dh2 of the plurality of second bumps.

7. The anti-fog sheet structure according to claim 1, wherein the surface of the first synthetic polymer film has a contact angle to water of 20° or more.

8. The anti-fog sheet structure according to claim 1, wherein the first synthetic polymer film is formed from a cured product of the photocurable resin further containing urethane acrylate.

9. The anti-fog sheet structure according to claim 8, wherein the urethane acrylate is such that a cured product of a mixture of 70 mass % of the urethane acrylate and 30 mass % of 2-(2-vinyloxyethoxy)ethyl acrylate monomer has a water absorption rate of more than 2.0%.

10. The anti-fog sheet structure according to claim 1, further comprising a third synthetic polymer film formed between the first main surface of the substrate and the first synthetic polymer film,
wherein the third synthetic polymer film has, on its surface, a plurality of third bumps having an equivalent circular area diameter Dp3 in a range of more than 20 nm and less than 500 nm as viewed in a normal direction of the third synthetic polymer film.

11. The anti-fog sheet structure according to claim 1, wherein the anti-fog sheet structure has a haze value of 1.0 or less.

12. The anti-fog sheet structure according to claim 1, wherein an absolute value of a* and an absolute value of b* of transmitted light in an L*a*b* color space are each independently 1.0 or less.

13. A helmet comprising a shield and a shell,
wherein the helmet further comprises an anti-fog sheet structure inside the shield with a gap therebetween,
the anti-fog sheet structure is the anti-fog sheet structure according to claim 1 and configured such that the first synthetic polymer film comes inside when the helmet is worn.

* * * * *